US 9,739,219 B2

(12) United States Patent
Itoh (10) Patent No.: US 9,739,219 B2
(45) Date of Patent: Aug. 22, 2017

(54) INTERNAL COMBUSTION ENGINE, VEHICLE EQUIPPED WITH SAME, AND CONTROL METHOD THEREFOR

(71) Applicant: ISUZU MOTORS LIMITED, Tokyo (JP)

(72) Inventor: Hikaru Itoh, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 14/407,111

(22) PCT Filed: Jun. 14, 2013

(86) PCT No.: PCT/JP2013/066460
§ 371 (c)(1),
(2) Date: Dec. 11, 2014

(87) PCT Pub. No.: WO2014/002793
PCT Pub. Date: Jan. 3, 2014

(65) Prior Publication Data
US 2015/0107564 A1 Apr. 23, 2015

(30) Foreign Application Priority Data

Jun. 28, 2012 (JP) ................................ 2012-145129

(51) Int. Cl.
*F02D 41/00* (2006.01)
*F02M 26/08* (2016.01)
(Continued)

(52) U.S. Cl.
CPC .......... *F02D 41/0007* (2013.01); *F02B 37/04* (2013.01); *F02D 21/08* (2013.01);
(Continued)

(58) Field of Classification Search
CPC ........................... F02M 25/0709; F02B 37/04
(Continued)

(56) References Cited

U.S. PATENT DOCUMENTS 4,730,457 A * 3/1988 Yamada .................. F02B 37/04
60/609
4,903,488 A * 2/1990 Shibata .................. F02B 37/04
123/562
(Continued)

FOREIGN PATENT DOCUMENTS

DE 102007019060 A1 * 11/2008 .............. F02B 37/04
JP 61016229 A * 1/1986
(Continued)

OTHER PUBLICATIONS

DE 102007019060 A1 English Translation.*
International Search Report mailed Aug. 27, 2013, in corresponding International Patent Application No. PCT/JP2013/066460.

*Primary Examiner* — Phutthiwat Wongwian
*Assistant Examiner* — Jessica Kebea
(74) *Attorney, Agent, or Firm* — Staas & Halsey LLP (57) ABSTRACT

A supercharger and a turbocharger are provided, as well as a load sensor detecting a traction load of a trailer towed by a semi-trailer and being arranged in a coupler. A combined supercharging and turbocharging is performed by the supercharger and the turbocharger when the traction load is heavier than a previously defined traction determination value. Only supercharging is performed by the turbocharger when the traction load is not more than the traction determination value.

6 Claims, 8 Drawing Sheets

(51) Int. Cl.
  *F02M 26/24* (2016.01)
  *F02B 37/04* (2006.01)
  *F02B 37/16* (2006.01)
  *F02D 21/08* (2006.01)
  *F02D 29/02* (2006.01)
  *F02D 23/00* (2006.01)
  *F02B 29/04* (2006.01)
  *F02B 39/04* (2006.01)
  *F02D 41/02* (2006.01)

(52) U.S. Cl.
  CPC .............. *F02D 23/00* (2013.01); *F02D 29/02* (2013.01); *F02D 41/005* (2013.01); *F02D 41/0052* (2013.01); *F02D 41/021* (2013.01); *F02M 26/08* (2016.02); *F02B 29/0406* (2013.01); *F02B 37/16* (2013.01); *F02B 39/04* (2013.01); *F02D 41/0065* (2013.01); *F02D 2200/50* (2013.01); *F02M 26/24* (2016.02); *Y02T 10/144* (2013.01); *Y02T 10/47* (2013.01)

(58) Field of Classification Search
  USPC ................................ 60/602.5, 609, 610, 612
  See application file for complete search history.

(56) References Cited

U.S. PATENT DOCUMENTS

| | | | |
|---|---|---|---|
| 6,058,916 A * | 5/2000 | Ozawa | F02B 33/34 123/559.3 |
| 2003/0140905 A1 | 7/2003 | Nau et al. | |
| 2007/0137199 A1 * | 6/2007 | Magner | F02B 37/127 60/602 |
| 2008/0047525 A1 * | 2/2008 | Morizane | F02B 37/04 123/344 |
| 2010/0114437 A1 | 5/2010 | Boss et al. | |

FOREIGN PATENT DOCUMENTS

| | | | |
|---|---|---|---|
| JP | 2-161130 | 6/1990 | |
| JP | 2-256830 | 10/1990 | |
| JP | 10-122007 | 5/1998 | |
| JP | 2000-314655 | 11/2000 | |
| JP | 2007-9780 | 1/2007 | |
| JP | 2008-274833 | 11/2008 | |
| JP | 2011-94589 | 5/2011 | |
| JP | 2012251509 A * | 12/2012 | ............ F02D 21/08 |

* cited by examiner

INTERNAL COMBUSTION ENGINE, VEHICLE EQUIPPED WITH SAME, AND CONTROL METHOD THEREFOR

CROSS-REFERENCE TO RELATED APPLICATIONS

This application is a U.S. National Stage Application, which claims the benefit under 35 U.S.C.§371 of PCT International Patent Application No. PCT/JP2013/066460, filed Jun. 14, 2013, which claims the foreign priority benefit under 35 U.S.C.§119 of Japanese Patent Application No. 2012-145129, filed Jun. 28, 2012, the contents of which are incorporated herein by reference.

TECHNICAL FIELD

The present invention relates to an internal combustion engine which carries out supercharging according to increase and decrease of a load applied to a vehicle, a vehicle equipped with the same, and a control method therefor.

BACKGROUND ART

In recent years, in the light of internationalization of physical distribution or mass transit, a marine transportation is frequently performed, and travel of a semi-trailer (a traction vehicle) transporting a marine container is frequently performed. Further, in the container transportation, it is possible to suppress discharge of CO2 which causes global warming by utilizing a public mass transit network such as railroads in addition to marine vessels, that is, by restricting the transportation by the trailer in land transportation.

As a result, the container transportation by the semi-trailer is assumed to be movement of the container from unloading from the marine vessel to a container yard, transportation from the container yard to a railway container station, and transportation of the container from the container yard to a consignor.

Figure 8:
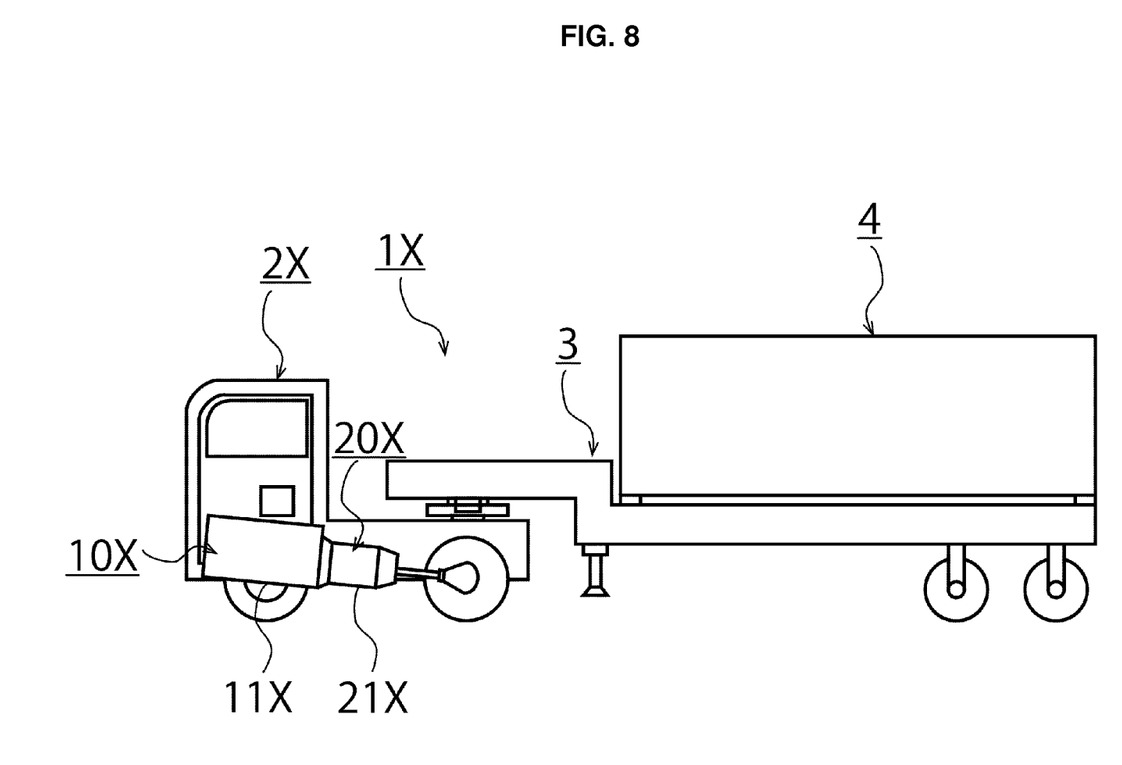
FIG. 8 is a side view schematically showing a vehicle equipped with a conventional internal combustion engine.

Here, a description will be given of the semi-trailer with reference to FIG. 8. A semi-trailer 1X is constructed by a trailer 3 which has a container 4 on board, and a tractor head 2X which tows the trailer 3, and the tractor head 2X comes to a vehicle equipped with an engine 10X which includes an engine main body 11X having a large displacement, and a power train 20X which includes a large-scaled multi-stage transmission 21X, for towing the trailer 3 which has the container 4 on board. In order to improve a fuel consumption of the semi-trailer 1X, downsizing and speeding down are promoted in relation to the engine 10X and the power train 20X in recent years.

The transportation of the marine container 4 by the semi-trailer 1X can hold down an energy consumption for the transportation by performing the transportation linked with the other mass transportation modes. However, in relation to the structure of the trailer 3, a mode of packing which can be boarded on is limited to the standardized marine container 4 or the structure conforming to the standardized marine container 4. Therefore, after transporting the cargo to the transport destination, the tractor head returns to the container yards or harbor facilities while towing the container 4 or the trailer 3 having the container 4 on board if the same container 4 of the trailer 3 having the container 4 on board exists at the transport destination. However, in other cases, the tractor head 2X returns while towing the trailer 3 which does not have the container 4 on board, or only the tractor head 2X travels back without the trailer 3.

Since the tractor head 2X towing the trailer 3 originally aims at towing the trailer 3 which has the container 4 on board, the engine 10X having a large displacement and a high output, and the large-scaled multi-stage transmission 21X are mounted on the tractor head 2X. However, as mentioned above, the necessary engine output is apparently different in the travel only by the tractor head 2X, or the travel in the state of towing the trailer 3 on which the container 4 is not mounted, from the state in which the container 4 is mounted, and the engine 10X is used in a low output state. Therefore, the gear stage which is provided in the engine 10X of a large scale and the high output and the large-scaled multi-stage transmission 21X and which is required at the starting time in the state having the container 4 on board is not necessary.

More specifically, in the travel having the container 4 on board, the engine 10X having the large displacement, the high output and the high torque, and the multi-stage transmission 21X are required, while in the travel only by the tractor head 2X or the travel in the state having no container 4 on board, it is possible to travel with a small displacement engine and a small-scaled multi-stage transmission (here, the small-scaled multi-stage transmission indicates a transmission having fewer gears by doing away with the gear stage which is used at the starting time or at the transient time (for example, at the accelerating time from the low speed) in the state in which the trailer has the container on board.

In connection with the above, there is an apparatus which is structured such as to select a control pattern of a boost characteristic according to a loaded condition and an empty condition which are detected by a road sensing switch, and controls an instructed injection amount according to the boost characteristic pattern which reduces the injection amount at about 20% in the empty condition (refer, for example, to patent document 1).

Further, there is also an apparatus which realizes the high torque in a whole of an engine working range and achieves improvement of the fuel consumption and the output, by using an engine which is based on combination of a two-stage turbo system and a VGS (a variable blade turbo mechanism) and has a small displacement and a highly supercharging, the two-stage turbo system being obtained by combining a high-pressure stage turbocharger and a low-pressure stage turbocharger with the engine having the small displacement.

However, since an exhaust gas energy is utilized in the supercharging mentioned above, supercharge response delay, that is, a turbo lag is generated in the supercharging at the starting time from the idling having less exhaust gas energy, and the supercharging under the rapid transit to the transient state from the steady operation state. As a result, there is a problem that torque shortage is generated at the starting time and the transient time, or a problem of smoke. These problems are particularly significant in the semi-trailer in which a loading amount significantly varies.

Here, as a device configured to improve a starting torque and improve a transient supercharging characteristic, it is thought to utilize a supercharger (a mechanical supercharging device; hereinafter refer to as S/C) which picks up rotary motion from an engine crank shaft so as to supercharge. However, in the supercharging by the S/C, there is generated a case that the fuel consumption is deteriorated due to drive loss of the S/C particularly in a high speed side of the engine running speed.

PRIOR ART DOCUMENT

Patent Document 1: Japanese patent application Kokai publication No. 10-122007

SUMMARY OF THE INVENTION

The present invention is made by taking the problems mentioned above into consideration, and an object of the present invention is to provide an internal combustion engine so as to compensate torque shortage at a heavy load time and improve fuel consumption at a light load time, thereby achieving downsizing and speeding down, by performing two-stage combined supercharging using a supercharger and a turbocharger at a heavy traction load time or a heavy loading load time, and by performing single supercharging by using only the turbocharger at a light traction load time or a light loading load time; a vehicle equipped with the internal combustion engine, and a control method therefore.

An internal combustion engine according to the present invention for achieving the object mentioned above is an internal combustion engine including a supercharger and a turbocharger, in which the internal combustion engine further includes a control device which switches between the combined supercharging performed by the supercharger and the turbocharger and the single supercharging performed only by the turbocharger, according to a traction load which a vehicle tows or a loading load loaded on the vehicle.

According to the structure, it is possible to switch a plurality of supercharging modes according to the load applied to the vehicle, that is, the traction load with which the vehicle tows or the loading load loaded on the vehicle. More specifically, in the case where the load applied to the vehicle is heavy (hereinafter, refer to as heavy load time), the combined supercharging having two stages of the supercharger and the turbocharger is performed. On the other hand, in the case where the load applied to the vehicle is light (hereinafter, refer to as light load time), the single supercharging only by the turbocharger is performed.

As a result, it is possible to achieve the downsizing and the speeding down by compensating the torque shortage at the heavy load time and improving the fuel consumption at the light load time. Further, since a transmission device does not require a gear stage for high output and high torque, the transmission device can be downsized.

For example, a description will be given by exemplifying a semi-trailer. In the case that the tractor head (the traction vehicle) tows the trailer (the towed vehicle) which has the container (cargo) on board, it is possible to secure the torque at the starting time and the transient time and improve the transient supercharging characteristic so as to reduce the exhaust gas by using the combined supercharging having two stages of the supercharger and the turbocharger, at the starting time and the transient time (for example, at the accelerating time from the low speed) of the internal combustion engine when a load condition is high. Further, in the case where the tractor head does not tow the trailer or the case that the trailer does not have the container on board, the deterioration of the fuel consumption can be suppressed by using the single supercharging only by the turbocharger.

The supercharger means a mechanical supercharger, and is a supercharger which obtains driving force mainly from the internal combustion engine, and the turbocharger means a supercharger which is driven by exhaust gas energy. A VGS mechanism (a variable blade turbo mechanism) may be mounted to the turbocharger.

Further, the internal combustion engine mentioned above may be provided with a load sensor which detects the traction load or the loading load, and the control device may be provided with a load determining unit configured to determine whether or not the traction load or the loading load is greater than a previously defined determination value, a combined supercharging unit configured to perform the combined supercharging by the supercharger and the turbocharger on the basis of an operating state of the vehicle in the case where the traction load or the loading load is greater than the determination value, and a single supercharging unit configured to perform the single supercharging only by the turbocharger in the case where the traction load or the loading load is not more than the determination value. In this case, it is possible to suppress the torque shortage at the starting time or the transient time under the heavy load condition, and the increase of the exhaust gas caused by the torque shortage, by switching between the combined supercharging and the single supercharging according to the traction load or the loading load which is detected by the load sensor, whereby it is possible to prevent the fuel consumption at the light load time from being deteriorated.

It is sufficient for the load sensor to detect whether the traction vehicle tows a towed vehicle or the loading condition of the towed vehicle in the case of the traction vehicle, and the load sensor is preferably provided in a coupler (a fifth wheel) corresponding to a connection portion which connects the towed vehicle. Further, in the case of a cargo vehicle, it is sufficient for the load sensor to detect an axle load or a wheel load, and the load sensor is preferably provided in the axle or the wheel shaft.

Here, the traction vehicle means the semi-trailer or a full trailer, and the traction load indicates the load applied to the traction vehicle, that is, the load when the traction vehicle tows the towed vehicle, and the load when the towed vehicle has the cargo on board. Further, the cargo vehicle means a truck, and the loading load means the load applied to the cargo vehicle, that is, the load of the cargo which the cargo vehicle has on board.

Further, the operating state of the vehicle here indicates a rotating speed of the internal combustion engine, an instructed injection amount, a vehicle speed, an accelerating operation or an intake air amount. For example, it is possible to employ a map based on the rotating speed of the internal combustion engine and the instructed injection amount, and an increase and decrease map of the intake air amount, for switching between the turbocharger and the supercharger.

In addition, the internal combustion engine mentioned above may be provided with a low pressure exhaust gas recirculation ("EGR") system which recirculates the exhaust gas in a downstream side of the exhaust gas in the turbocharger, and a high pressure EGR system which recirculates the exhaust gas in an upstream side of the exhaust gas in the turbocharger, and the control device may be provided with a unit configured to recirculate the exhaust gas only by the low pressure EGR system at the time of supercharging by the supercharger performed in the combined supercharging, and at the time of supercharging by the turbocharger performed in the single supercharging, and configured to recirculate the exhaust gas by the low pressure EGR system and the high pressure EGR system on the basis of the operating condition of the vehicle at the time of supercharging by the turbocharger performed in the combined supercharging. In this case, it is possible to perform the EGR control according to the supercharging unit.

More specifically, since the single supercharging only by the turbocharger is performed at the low load time including the light load time, the low pressure EGR system is used for allowing a whole amount of the exhaust gas to pass through the turbine of the turbocharger. Further, since the flow rate of the exhaust gas is small in the operating range of the supercharger at the high load time including the heavy load time, the low pressure EGR system is used, and, the high pressure EGR system is used in the case where the exhaust gas flow rate is increased in the operating range of the turbocharger.

As a result, it is possible to improve the fuel consumption by efficiently driving the turbocharger at the low load time including the light load time, and it is possible to achieve the switching between the supercharger and the turbocharger in early stages by allowing the whole amount of the exhaust gas to pass through the turbine of the turbocharger in the operating range of the supercharger at the high load time including the heavy load time.

A vehicle for solving the problem mentioned above is constructed by mounting the internal combustion engine described above. According to the structure, the operations and effects mentioned above can be obtained by the internal combustion engine which switches the supercharging according to the load applied to the vehicle. Further, since it is possible to mount the internal combustion engine which aims at the downsizing and the speeding down, and the downsized transmission device, it is possible to further improve the fuel consumption and it is possible to reduce a manufacturing cost.

Further, the vehicle described above may be formed by a traction vehicle which tows a towed vehicle having the cargo on board, and a load sensor is arranged in a connection portion to the towed vehicle, and detects whether or not the towed vehicle is towed, and whether or not the traction vehicle has the cargo on board. In this case, it is possible to switch between the combined supercharging and the single supercharging according to the traction load. Particularly, the present invention can be preferably applied to the semi-trailer in which the loading load significantly varies, and the load sensor is preferably provided in the coupler (the fifth wheel) which is the connection portion between the tractor head and the trailer.

A control method for an internal combustion engine for solving the problem mentioned above is a control method for an internal combustion engine including a supercharger and a turbocharger, in which the method includes a step of switching between a combined supercharging by the supercharger and the turbocharger and a single supercharging only by the turbocharger, according to a traction load which the vehicle tows or a loading load loaded on the vehicle.

Further, the control method for the internal combustion engine mentioned above preferably includes the steps of determining whether or not the traction load or the loading load detected by the load sensor is greater than a previously defined determination value, performing the combined supercharging by the supercharger and the turbocharger on the basis of an operating state of the vehicle in the case where the traction load or the loading load is greater than the determination value, and performing the single supercharging only by the turbocharger, in the case where the traction load or the loading load is not more than the determination value.

In addition, the control method for the internal combustion engine mentioned above preferably recirculates the exhaust gas only by a low pressure EGR system which recirculates the exhaust gas in a downstream side of the exhaust gas in the turbocharger at the time of supercharging by the supercharger performed in the combined supercharging, and at the time of supercharging by the turbocharger performed in the single supercharging, and recirculates the exhaust gas by the low pressure EGR system and a high pressure EGR system which recirculates the exhaust gas in an upstream side of the exhaust gas in the turbocharger, on the basis of the operating state of the vehicle, at the time of supercharging by the turbocharger performed in the combined supercharging.

According to the method, it is possible to achieve the improvement of the torque at the starting time and the transient time and the improvement of the fuel consumption even in the internal combustion engine with the small displacement, by using the combined supercharging having two stages and obtained by combining the supercharger and the turbocharger, and the single supercharging only by the turbocharger. Further, it is possible to recirculate the exhaust gas according to the supercharging method mentioned above by using two EGR systems.

According to the present invention, it is possible to compensate the torque shortage at the heavy load time and improve the fuel consumption at the light load time, by performing the combined supercharging having two stages performed by the supercharger and the turbocharger at the heavy load time when the load applied to a vehicle is heavy, and performing the single supercharging only by the turbocharger at the light load time when the load applied to the vehicle is light. As a result, it is possible to achieve the downsizing and the speeding down of the internal combustion engine. Further, it is also possible to downsize the transmission device.

BRIEF DESCRIPTION OF THE DRAWINGS

FIGS. 1(a) to 1(c) are side views each schematically showing a vehicle equipped with an internal combustion engine according to an embodiment of the present invention, in which FIG. 1(a) shows a state in which a traction vehicle tows a towed vehicle having a cargo on board, FIG. 1(b) shows a state in which the traction vehicle tows the towed vehicle, and FIG. 1(c) shows a state of only the traction vehicle.

DETAILED DESCRIPTION

A description will be given below of an internal combustion engine according to embodiments of the present invention, a vehicle equipped with the internal combustion engine, and a control method for the internal combustion engine, with reference to the accompanying drawings. In one embodiment, as shown in FIGS. 1(a) to 1(c), a semi-trailer (a vehicle) 1 is provided with a tractor head (a traction vehicle) 2 and a trailer (a towed vehicle) 3, and the trailer 3 has a container (cargo) 4 on board and stabilizers 8. In the embodiment, the description is given by exemplifying the semi-trailer 1, but the present invention is preferable for a vehicle which carries the cargo on board, and may be applied, for example, to a full trailer as a traction vehicle or a truck which is a cargo vehicle having the cargo on the board.

Further, a description will be given of an engine (an internal combustion engine) 10 which is provided in the tractor head 2, by exemplifying an in-line four-cylinder diesel engine. However, the present invention is not limited to the diesel engine, but can be applied to a gasoline engine, and a number of the cylinders and an arrangement of the cylinders are not limited. With regard to the drawings, dimensions are changed so as to easily understand the structure, and a rate of thickness, width and length of each of the members and each of the parts is not necessarily brought into line with a rate of actual manufacturing structures.

Figure 1:
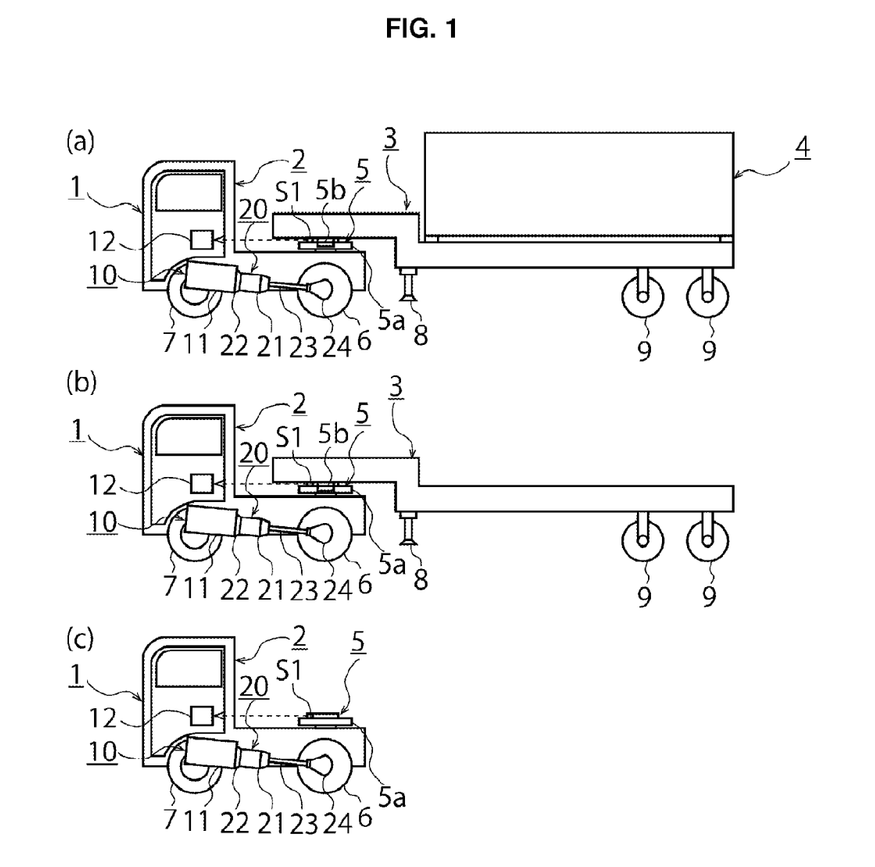

First of all, a description will be given of the semi-trailer (the vehicle) 1 which mounts the internal combustion engine according to the embodiment of the present invention thereon with reference to FIG. 1. The semi-trailer 1 is provided with an engine 10 of a small displacement, as shown in FIG. 1(a), which is switchable between a combined supercharging and a single supercharging, in place of an engine 10X of a conventional semi-trailer 1X as shown in FIG. 8, and a compact transmission 21 of a power train 20 shown in FIG. 1(a), in place of a transmission 21X of a power train 20X shown in FIG. 8, and is additionally provided with a load sensor S1 in a coupler (a fifth wheel) 5a of a connection portion 5.

Figure 2:
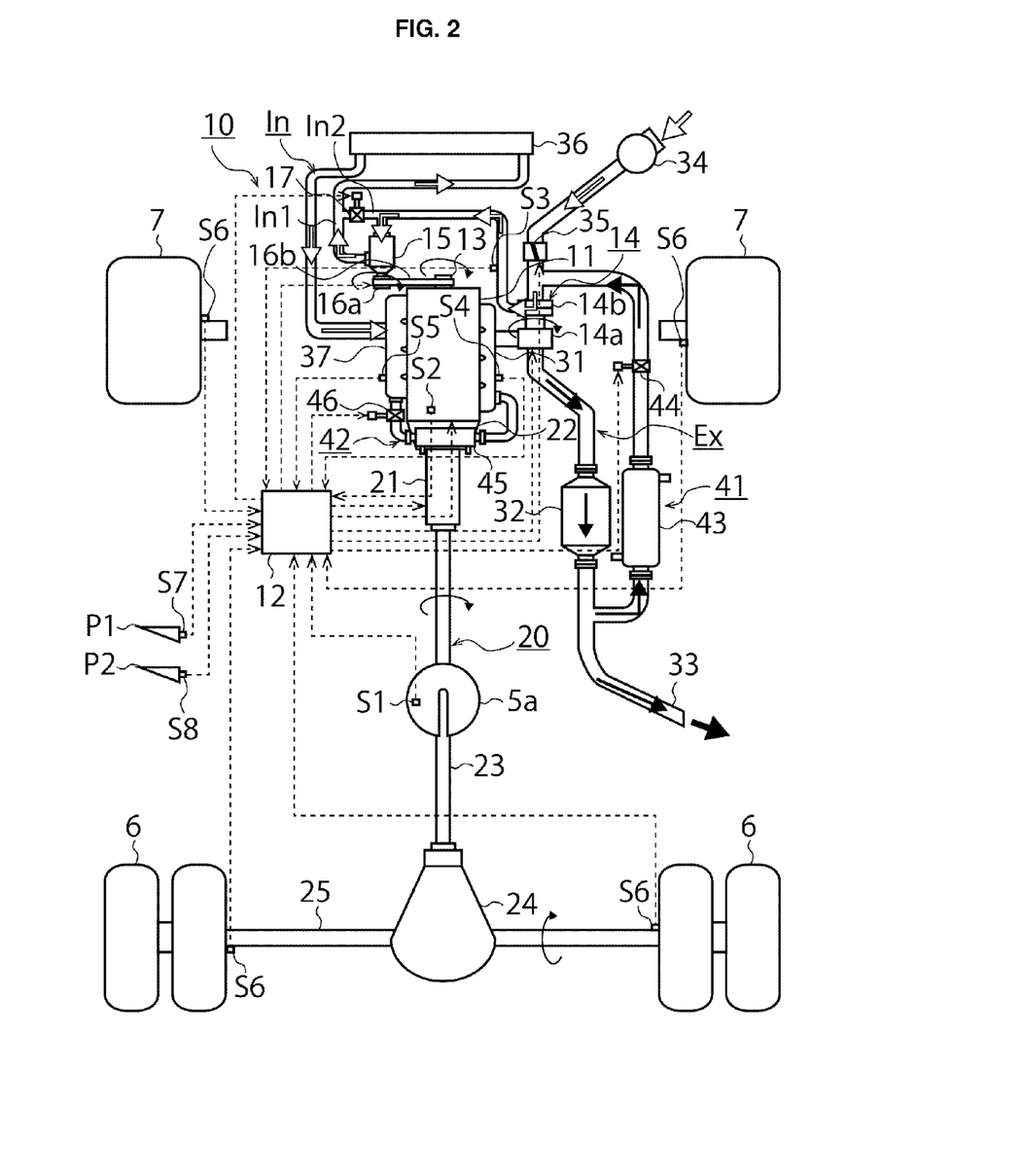
FIG. 2 is a schematic view showing the internal combustion engine according to an embodiment of the present invention, and shows a state of the starting time or the transient time under a heavy load condition.

Further, the engine 10 is provided with an engine main body 11, an ECU (an engine control unit) 12, a crank shaft 13, a turbocharger (hereinafter refer to as T/C) 14, a supercharger (hereinafter refer to as S/C) 15, a supercharger clutch (hereinafter refer to as S/C clutch) 16a, and an intake switch valve 17, as shown in FIG. 2.

In the engine 10, the ECU 12 is provided with a unit configured to switch between the combined supercharging of two stages of the T/C 14 and the S/C 15 and the single supercharging only by the T/C 14 with the S/C clutch 16a and the intake switch valve 17, according to a traction load W1 which is detected by the load sensor S1 and acts on the tractor head 2.

Figure 3:
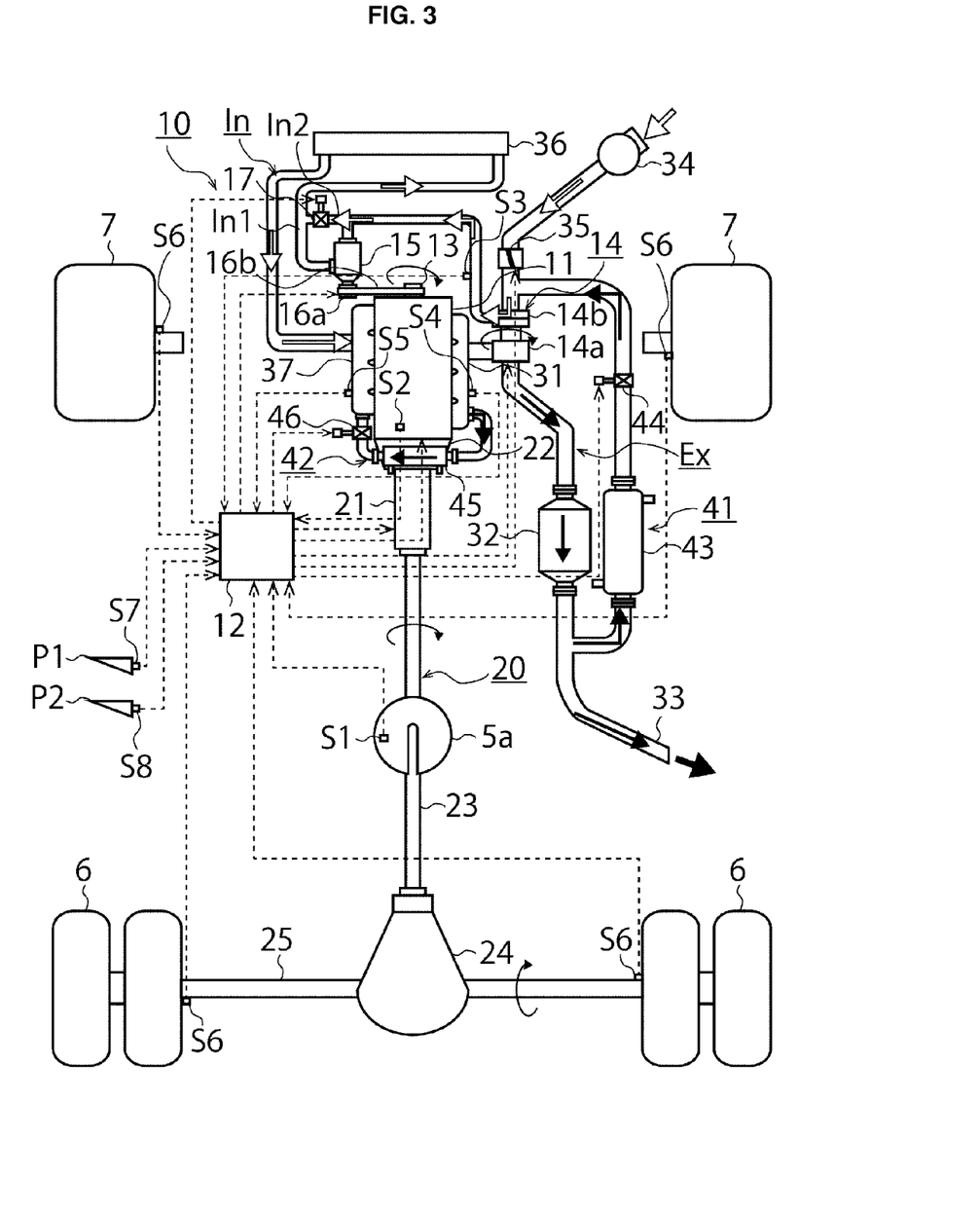
FIG. 3 shows a state of the normal running time under a heavy load condition of the internal combustion engine in FIG. 2.

As shown in FIG. 1(a), in the case where the tractor head 2 tows the trailer 3, and the trailer 3 has the container 4 on board (hereinafter refer to as heavy load time), the supercharging is performed by the S/C 15 by fully closing the intake switch valve 17 and connecting the S/C clutch 16a, as shown in FIG. 2, at the starting time or the transient time of the semi-trailer 1 (for example, the accelerating time from a partial load, that is, the accelerating time from a low speed or the accelerating time from an idling state), and the supercharging is performed by using both the S/C 15 and the T/C 14 by controlling the intake switch valve 17 on the basis of the operating state of the vehicle. On the other hand, in the normal running time (including a high-speed and high-load range), the supercharging is performed only by the T/C 14 by fully opening the intake switch valve 17 and disconnecting the S/C clutch 16a, as shown in FIG. 3.

Further, in the case where the tractor head 2 tows the trailer 3, but the trailer 3 does not have the container 4 on board, as shown in FIG. 1(b), or in the case where the tractor head 2 does not tow the trainer 3, as shown in FIG. 1(c) (hereinafter, FIGS. 1(b) and 1(c) collectively referred to as a light load time), all the operating ranges are supercharged only by the T/C 14.

According to the structure, it is possible to secure a starting torque and a torque at the accelerating time and improve a transient supercharging characteristic by switching the supercharging modes according to the traction load W1 of the semi-trailer 1 detected by the load sensor S1 so as to use the combined supercharging of two stages of the T/C 14 and the S/C 15 at the heavy load time. Further, it is possible to suppress deterioration of a fuel consumption by using the single supercharging only by the T/C 14 at the light load time.

Particularly, since it is possible to secure the starting torque and the torque at the accelerating time by using the combined supercharging of two stages of the T/C 14 and the S/C 15 in the case where the traction load W1 applied to the semi-trailer 1 is heavy, it is possible to achieve downsizing (small displacement) and speeding down of the engine 10, and it is possible to widely improve the fuel consumption of the semi-trailer 1.

Further, the high-torque and high-output gear ratio which has been conventionally essential is not essential by performing the high supercharging by the S/C 15 at the starting time and the transient time under the heavy load condition which require the high torque and the high output, and it is further possible to downsize the transmission 21.

A description will be given in more detail of the engine 10. As shown in FIG. 2, the power train 20 efficiently transmitting rotational energy generated in the engine 10 to the drive wheel 6 (compared with non-driven wheels 7, 9) is provided with the transmission 21, a clutch 22, a propeller shaft 23, a differential gear 24 and a drive shaft 25.

Further, the engine 10 is provided with an exhaust manifold 31, an exhaust gas after-treatment device 32, a muffler 33, an air cleaner 34, an intake throttle 35, an intercooler 36, and an inlet manifold (an intake manifold) 37. Each of the devices is connected by a piping called as an exhaust piping or an intake piping, and an exhaust passage Ex and an intake passage In are formed.

In addition, the engine 10 is provided with a low-pressure EGR system (a low-pressure exhaust gas recirculation system; hereinafter, refer to as LP-EGR) 41, and a high-pressure EGR system (a high-pressure exhaust gas recirculation system; hereinafter, refer to as HP-EGR) 42. The LP-EGR 41 is provided on an exhaust gas downstream side of the T/C 14, and is provided with an LP-EGR cooler 43 and an LP-EGR valve 44. The HP-EGR 42 is provided on an exhaust gas upstream side of the T/C 14, and is provided with an HP-EGR cooler 45 and an HP-EGR valve 46.

Further, the load sensor S1, a crank angle sensor S2, an intake air pressure sensor S3, an exhaust manifold pressure sensor S4, an inlet manifold pressure sensor S5, a vehicle sensor S6 including a vehicle speed sensor and an acceleration sensor, an accelerator opening degree sensor S7 and a brake sensor S8 are connected to the ECU 12 which corresponds to a microcontroller comprehensively performing an electrical control which is in charge of control of the engine 10 by an electric circuit.

The T/C 14 is a device which is arranged in an outlet portion of the exhaust manifold 31, receives the exhaust gas energy on a turbine 14a side, transmits the energy to a coaxial compressor 14b and carries out supercharging. In the case that a VGS mechanism is mounted to the T/C 14, with the VGS mechanism variably controlling a supercharging state on the basis of an amount of the exhaust gas, it is possible to change a supercharging amount according to an operating state (the starting time and the transient time, and the normal running time) of the semi-trailer 1, in the case where the single supercharging is performed at the light load time. Further, a waste gate may be provided on the T/C 14.

The S/C 15 is a device to which the rotation of the crank shaft 13 is transmitted by a belt 16b, etc. It is possible to control the driving of the S/C 15 by setting the S/C clutch 16a between the S/C 15 and the crank shaft 13, and connecting or disconnecting the S/C clutch 16a. In this embodiment, the S/C 15 is structured such as to be driven on the basis of the rotation of the crank shaft 13, but may be structured such as to be directly driven by an electric motor.

The intake switch valve 17 guides the supercharging from the T/C 14 to the intake manifold 37 by being fully opened, and guides the supercharging from the S/C 15 by being fully closed. The intake air coming out of the compressor 14b of the T/C 14 is branched into a passage In1 which heads for the S/C 15 and a passage In2 which runs into the intake manifold 37 directly via an intercooler 36 without passing through the S/C 15, and the passages In1 and In2 are switched by an intake switch valve 17 which is provided in a passage directly running into the intercooler 36.

Further, the intake switch valve 17 and the S/C clutch 16a may be preferably set so that the connection of the S/C clutch 16a can be performed regardless of the opening and closing of the intake switch valve 17, in such a manner as to disconnect the S/C clutch 16a in the case where the intake switch valve 17 is retained in a full-open state. In addition, the intake switch valve 17 is set so that the intake switch valve 17 can be controlled on the basis of the operating state of the semi-trailer 1, for example, an engine revolutions Ne detected by the crank angle sensor S2 and an instructed injection amount Qf.

The after-treatment device 32 is constructed, for example, by a DPF (a diesel particulate collecting filter), and is a device for emitting the purified exhaust gas to an outside of the vehicle. The after-treatment device 32 is not limited to the structure mentioned above, but may be constructed by a continuous reproduction type DPF in which a DOC (a diesel oxidation catalyst) is arranged in an upstream side of the DPF, or may be structured such that an urea SCR catalyst (an urea selective reduction catalyst) is added to a downstream side of the DPF.

The LP-EGR 41 is a system which is used at the supercharging time in the S/C 15 at the heavy load time, and at the time of supercharging only by the T/C 14 at the light load time, and the HP-EGR 42 is a system which is used in a range in which the amount of the exhaust gas is large at the heavy load time (a range including the operating range of the T/C 14).

The LP-EGR 41 and the HP-EGR 42 adjust a recirculation amount of the exhaust gas by controlling the LP-EGR valve 44 or the HP-EGR valve 46 which is provided in the EGR passage, on the basis of the operating state of the engine 10 (the engine revolutions Ne and the instructed injection amount Qf), and an EGR state (an EGR rate, etc.).

The arrangement of each of the devices is not limited to the above structure. For example, the intake throttle 35 may be arranged between the intercooler 36 and the intake manifold 37, and a recirculation outlet of the exhaust gas in the LP-EGR 41 may be connected to an intake piping in the vicinity of the intake manifold 37.

The load sensor S1 is a sensor embedded in the coupler 5a as the connection portion 5 between the tractor head 2 and the trailer 3, and measuring a load state which is applied to the tractor head 2. In the embodiment, the load sensor S1 is provided in the coupler 5a and detects the traction load W1 applied to the tractor head 2, but in the case where the present invention is applied to a cargo vehicle such as a truck in place of the semi-trailer 1, the load sensor S1 may be provided, for example, in an axle or a chassis to which the loading load is applied in the cargo.

The load sensor S1 determines a towing state of the tractor head 2 and the trailer 3, or a loading condition of the container 4 on the trailer 3, and the ECU 12 determines an engine load state (at the heavy load time or the light load time) which is necessary at the vehicle running time. Further, the embodiment receives control signals of an accelerator pedal P1 and a brake pedal P2, and signals detected by the respective sensors S1 to S8, and controls an instructed injection amount Qf of an injector (not shown) in the engine main body 11, an amount of the exhaust gas passing through the turbine 14a in the T/C 14, connection and disconnection of the S/C clutch 16a, opening and closing of the intake switch valve 17, adjustment of an opening degree of the intake throttle 35, opening and closing of the LP-EGR valve 44 and opening and closing of the HP-EGR valve 46.

Next, a description will be given of a motion of the engine 10 according to the embodiment of the present invention with reference to FIGS. 2 to 7. As shown in a flow chart in FIG. 4, the method first of all performs a step S10 that the load sensor S1 acquires the traction load W1. The step S10 may be set so as to be performed in the case where a king pin 5b is connected to the coupler 5a.

Figure 4:
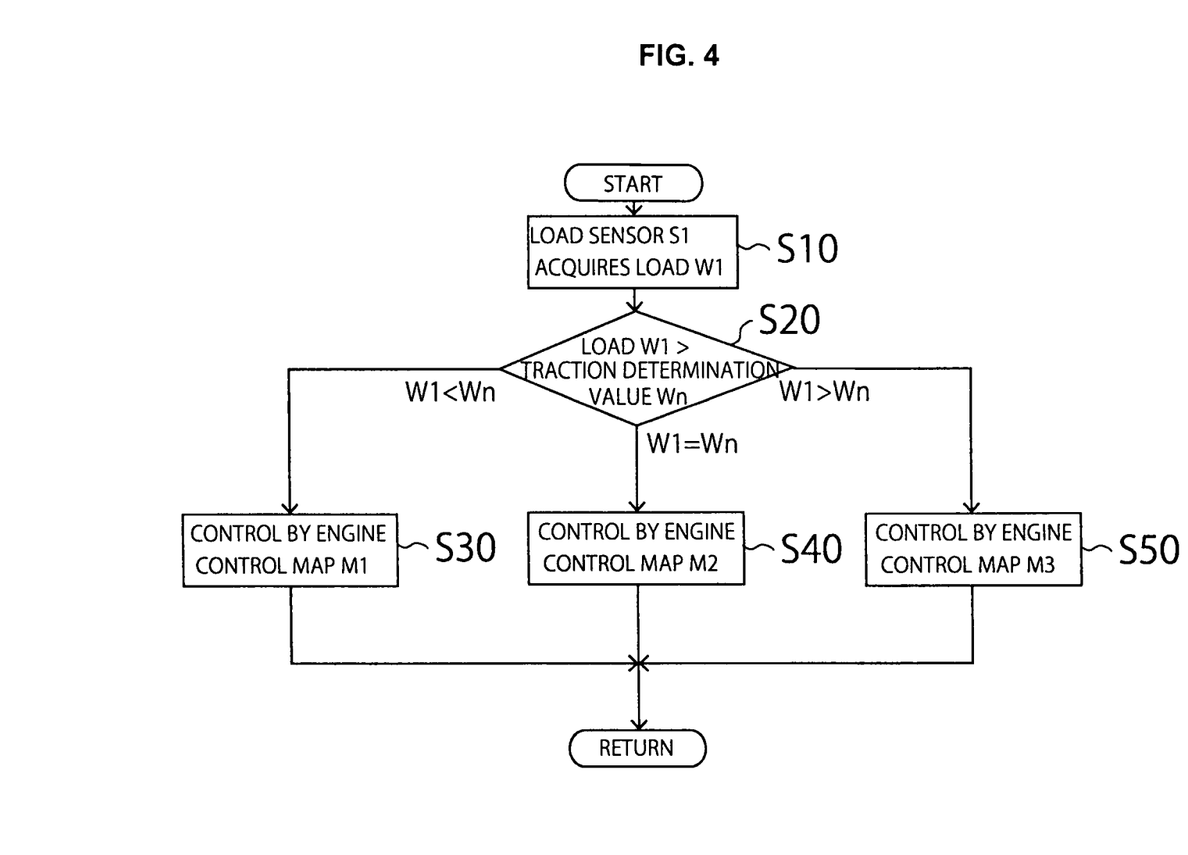
FIG. 4 is a flow chart showing a control method for the internal combustion engine according to an embodiment of the present invention.

Next, the method performs a step S20 which determines whether or not the traction load W1 is heavier than a previously defined traction determination value Wn. The traction determination value Wn is set to a reference which can determine that the trailer 3 is connected to the tractor head 2.

For example, in the case where the traction determination value Wn is set to a load of the trailer 3 which does not have the container 4 on board, it is possible to determine the case that, when the traction load W1 is smaller than the traction determination value Wn, it is in a state in which the tractor head 2 does not tow the trailer 3; when the traction load W1 is equal to the traction determination value Wn, it is in a state in which the tractor head 2 tows the trailer 3 which does not have the container 4 on board; and when the traction load W1 is more than the traction determination value Wn, it is in a state in which the tractor head 2 tows the trailer 3 with the container 4 on board.

In the case that the traction load W1 is lighter than the traction determination value Wn in the step S20, the case is determined as a state in which the trailer 3 is not connected to the tractor head 2, that is, a state in which the trailer 3 is not towed, and then, a step S30 is performed to control the engine 10 according to an engine control map M1.

Figure 5:
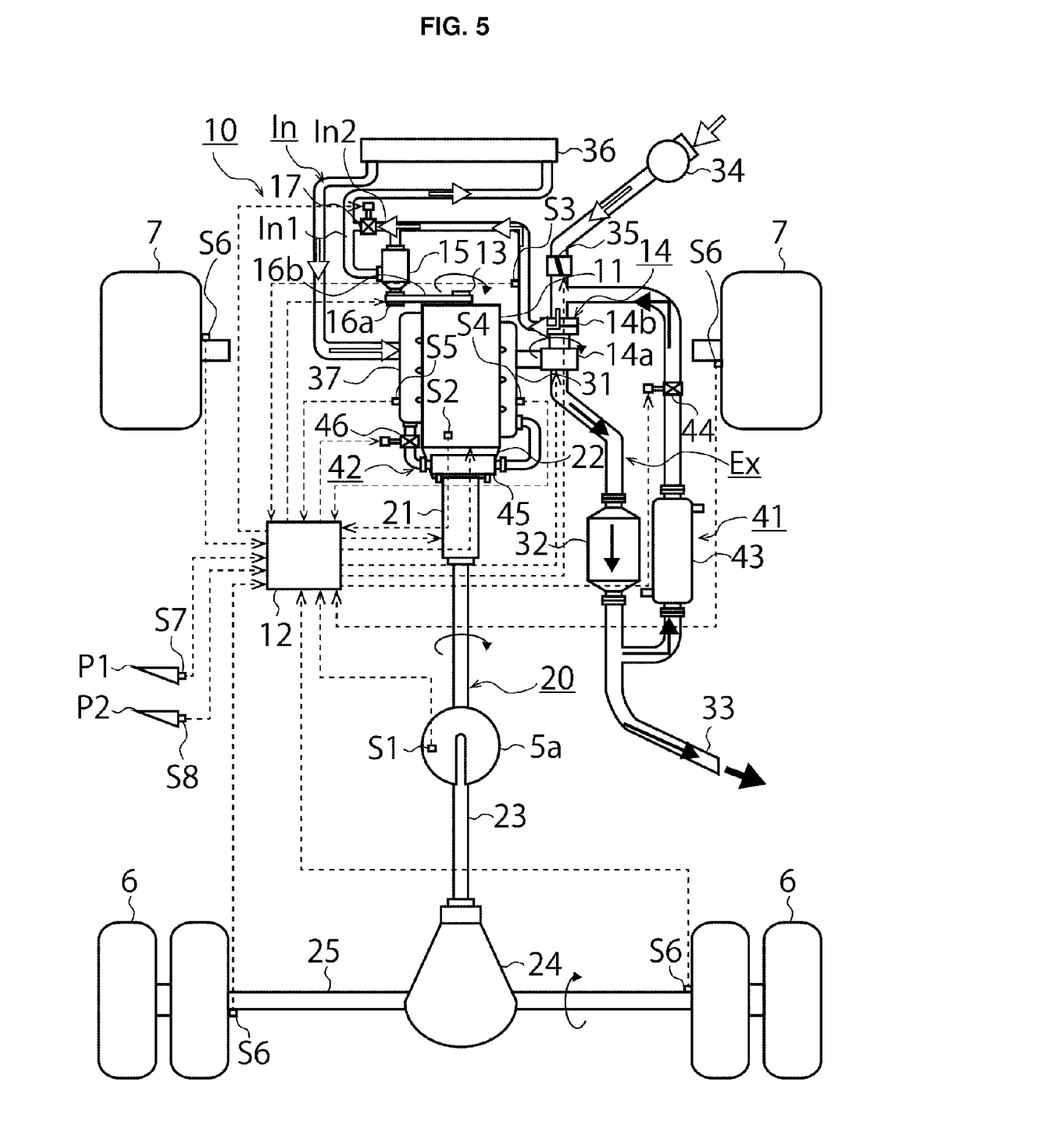
FIG. 5 shows a state of the running time of the internal combustion engine under a light load condition in FIG. 2.

The engine control map M1 is a map for controlling a single supercharging unit configured to perform the single supercharging only by the T/C 14, and a recirculation unit configured to recirculate the exhaust gas only by the LP-EGR 41, as shown in FIG. 5. A necessary torque at the starting time is low in a state in which the trailer 3 is not towed, that is, at the light load time, and the necessary torque at the normal running time and the reaccelerating time is also low, so that the load state applied to the semi-trailer 1 is generally in a low state.

Therefore, the single supercharging only by the T/C 14 is performed by retaining the intake switch valve 17 in the full-open state, and disconnecting the S/C clutch 16a. The disconnection control of the S/C clutch 16a is structured such as to control the intake switch valve 17 to the full-close, load the full-close signal of the intake switch valve 17 to the ECU 12 and transmit the disconnection signal from the ECU 12 to the S/C clutch 16a.

Further, the exhaust gas can be passed through the T/C 14 at an all amount by fully closing the HP-EGR valve 46 of the HP-EGR 42, and opening the LP-EGR valve 44 of the LP-EGR 41 so as to control the recirculation of the exhaust gas.

In the case that the traction load W1 is equal to the traction determination value Wn in the step S20, the case is determined as a state in which the trailer 3 having no container 4 on board is connected to the tractor head 2 as shown in FIG. 4, and then, a step S40 is performed to control the engine 10 according to an engine control map M2.

The engine control map M2 is a map for controlling the single supercharging unit configured to perform the single supercharging only by the T/C 14, and the recirculating unit configured to recirculate the exhaust gas only by the LP-EGR 41, as shown in FIG. 5. In the state where the container 4 is absent, the necessary torque at the starting time is low, and the necessary torque at the normal running time and the reaccelerating time is also low, and thus the load state acting on the semi-trailer 1 is lower in comparison with the loaded state, as described in the engine control map M1 mentioned above.

Then, the single supercharging only by the T/C 14 is performed by retaining the intake switch valve 17 in the full-open state, and disconnecting the S/C clutch 16a. The disconnecting control of the S/C clutch 16a is structured such as to control the intake switch valve 17 to the full-close, load the full-close signal of the intake switch valve 17 to the ECU 12, and transmit the disconnection signal from the ECU 12 to the S/C clutch 16a.

Further, the recirculation of the exhaust gas is controlled by fully closing the HP-EGR vale 46 of the HP-EGR 42, and opening the LP-EGR valve 44 of the LP-EGR 41. According to the structure, the exhaust gas can be passed through the T/C 14 in full amount.

In the case that the traction load W1 is heavier than the traction determination value Wn in the step S20, the case is determined as a state in which the trailer 3 has the container 4 on board, and then, a step S50 is performed to control the engine 10 according to an engine control map M3.

The engine control map M3 is a map for controlling the combined supercharging unit configured to perform the combined supercharging of two stages of the S/C 15 and the T/C 14, and the recirculating unit configured to recirculate the exhaust gas of two stages of the LP-EGR 41 and the HP-EGR 42, as shown in FIGS. 2 and 3.

The combined supercharging of two stages of the S/C 15 and the T/C 14 is constructed by the supercharging by the S/C 15 at the starting time and the transient time under the heavy load condition, as shown in FIG. 2, and the supercharging by the T/C 14 at the normal running time under the heavy load condition as shown in FIG. 3. Further, the recirculation of the exhaust gas of two stages of the LP-EGR 41 and the HP-EGR 42 is constructed by the recirculation of the exhaust gas by the LP-EGR 41 in the case where the flow rate of the exhaust gas is small as shown in FIG. 2, and the recirculation of the exhaust gas by the HP-EGR 42 in the case where the flow rate of the exhaust gas is large as shown in FIG. 5.

Further, a description will be given of the starting time and the transient time under the heavy load condition with reference to FIG. 2. At the starting time and the transient time under the heavy load condition, it is impossible to sufficiently supercharge by the T/C 14 since the flow rate of the exhaust gas is small and the energy of the exhaust gas is low. Accordingly, the supercharging by the S/C 15 is performed by connecting the S/C clutch 16a.

Optimally, it is preferable to connect the S/C clutch 16a by fully closing the intake switch valve 17 at the starting time from the stopping time of the engine 10, and it is preferable to connect the S/C clutch 16a regardless of an opening and closing angle of the intake switch valve 17 at the accelerating time from the idle state and the low speed side of the engine 10.

Further, the ECU 12 opens the LP-EGR valve 44 and closes the HP-EGR valve 46 so as to supply the EGR gas which passes through the turbine 14a of the T/C 14 and is treated by the after-treatment device 32 to the engine main body 11. At this time, the amount of the EGR gas is adjusted by the opening degrees of the intake throttle 35 and the LP-EGR valve 44, according to the EGR map on the basis of the EGR rate.

Next, a description will be given of the normal running time under the heavy load condition with reference to FIG. 3. Since the flow rate of the exhaust gas is large and the energy of the exhaust gas is high at the normal running time under the heavy load condition or the high-speed running time, the supercharging is performed only by the T/C 14. Accordingly, the ECU 12 fully opens the intake switch valve 17, and the S/C clutch 16a is disconnected. At this time, the supercharging pressure is preferably controlled by the VGS mechanism which is provided in the T/C 14.

Further, the ECU 12 closes the LP-EGR valve 44 on the basis of the operating state of the semi-trailer 1, for example, the engine revolutions Ne and the instructed injection amount Qf, and opens the HP-EGR valve 46 to supply the EGR gas to the engine main body 11 by the HP-EGR 42.

Figure 6:
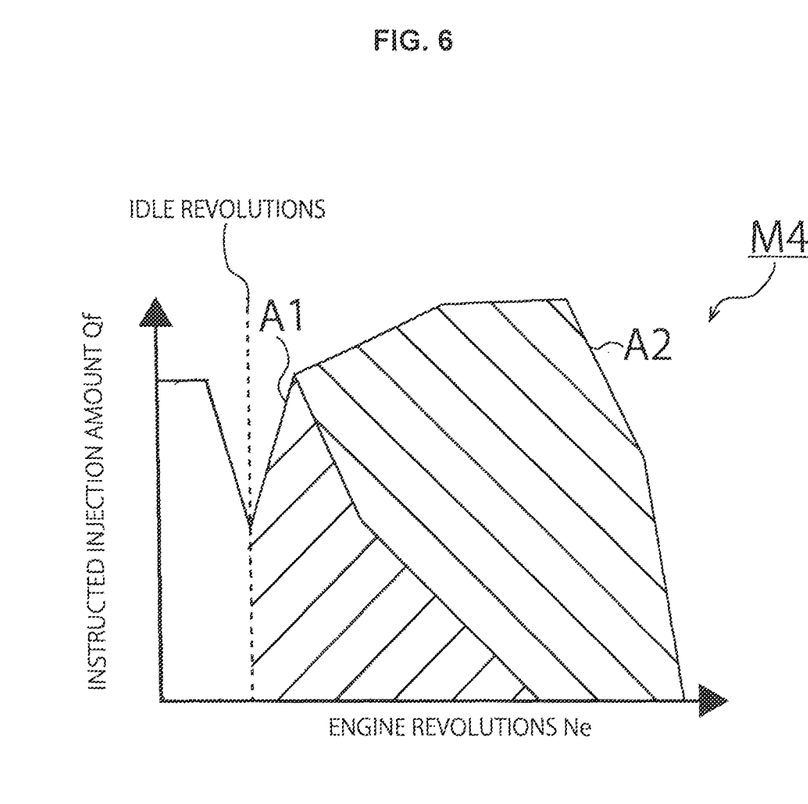
FIG. 6 shows a supercharging switch map at the heavy load time of the internal combustion engine according to an embodiment of the present invention.

Here, the switching between the supercharging of the S/C 15 and the supercharging of the T/C 14 is complemented with reference to FIG. 6. A map M4 is a supercharging switch map M4 which is based on the engine revolutions Ne and the instructed injection amount Qf, and shows A1 which is the simultaneous operating range of the S/C 15 and the T/C 14, and A2 which is the operating range of the T/C 14.

In the operating range A1, the supercharging state of the S/C 15 and the T/C 14 is controlled on the basis of the opening and closing control by controlling the intake switch valve 17 in the state in which the S/C clutch 16a is connected. The intake switch valve 17 at this time is preferably controlled according to the flow rate of the exhaust gas passing through the turbine 14a of the T/C 14, for example, is preferably controlled to the full-close side in the case where the engine revolutions Ne or the instructed injection amount Qf is low, and to the full-open side in the case where the engine revolutions Ne or the instructed injection amount Qf is high.

In this embodiment, the S/C clutch 16a and the intake switch valve 17 are controlled by determining which range of the supercharging switch map M4 the engine revolutions Ne calculated from the signal detected by a crank angle sensor S2 and the instructed injection amount Qf exist.

Figure 7:
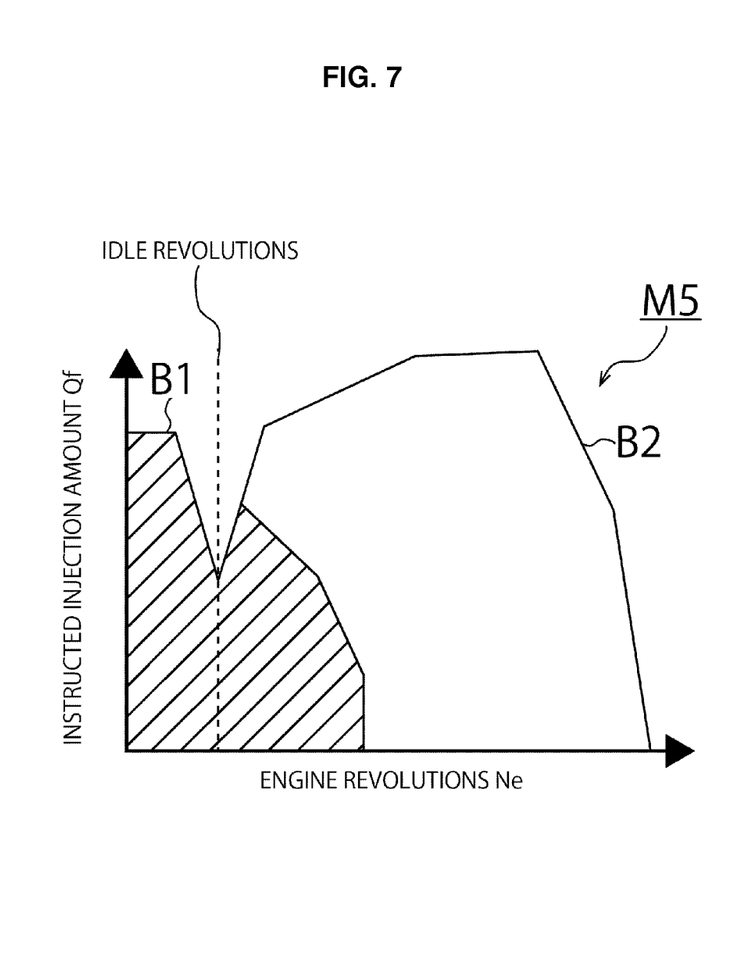
FIG. 7 shows an EGR switch map at the heavy load time of the internal combustion engine according to an embodiment of the present invention.

Next, the switching between the LP-EGR 41 and the HP-EGR 42 will be complemented with reference to FIG. 7. A map M5 shows an EGR switch map M5, and shows B1 which is an operating range of the LP-EGR 41 and B2 which is an operating range of the HP-EGR 42.

A boundary between the operating range B1 and the operating range B2 is in a state in which an exhaust manifold internal pressure detected by the exhaust manifold pressure sensor S4 becomes equal to an intake manifold internal pressure detected by the intake manifold pressure sensor S5. In other words, a timing for switching from the LP-EGR 41 to the HP-EGR 42 is the time that the exhaust manifold internal pressure becomes higher than the intake manifold internal pressure. As a result, the EGR gas can be supplied by the LP-EGR 41 in a state in which the flow rate of the exhaust gas is small, and the EGR gas can be supplied by the HP-EGR 42 in a state in which the flow rate of the exhaust gas is large.

Basically, the exhaust gas is recirculated by the LP-EGR 41 in the combined supercharging range of two stages of the S/C 15 and the T/C 14, and the exhaust gas is recirculated by the HP-EGR 42 in the single supercharging range only by the T/C 14 under the heavy load condition. Since the supercharging is mechanically performed in the supercharging range of the S/C 15, the intake manifold internal pressure becomes higher than the exhaust manifold internal pressure, and the exhaust gas cannot be sufficiently recirculated by the HP-EGR 42.

Further, in the case where the exhaust gas by the LP-EGR 41 is recirculated in the high-speed high-load range of the supercharging range of the T/C 14, the pumping loss of the engine main body 11 rises due to the increase of the exhaust manifold internal pressure. As a result, it is necessary to decrease the exhaust manifold internal pressure by the HP-EGR 42. The switching by the EGR switch map M5 may be different according to selection of the T/C 14.

Next, a description will be given by exemplifying a state which transits to the normal traveling after accelerating from the idle state under the heavy load condition, in keeping with the complementation mentioned above. First of all, the idle state is a state in which the intake switch valve 17 is fully closed and the S/C clutch 16a is disconnected, and is a state in which the S/C 15 does not rotate. Next, in the case where the accelerator ON is detected by an accelerator opening degree sensor S7 installed in an accelerator pedal P1, the signal is transmitted to the ECU 12, and the ECU 12 transmits the signal for connecting the S/C clutch 16a.

Next, the supercharging by the S/C 15 is immediately started upon the rising of the engine revolutions Ne by the operation of the accelerator pedal P1, and the supercharging pressure rises. Further, at this time, in the operating range of the S/C 15, the LP-EGR 41 is used, and the supercharging is adjusted on the basis of the opening degree of the LP-EGR valve 44 according to the EGR map based on the EGR rate.

As a result, since the supercharging by the S/C 15 can be performed at the starting time and the transient time under the heavy load condition in which the flow rate of the exhaust gas is small, it is possible to suppress response delay of the supercharging, that is, generation of a turbo lag, and it is possible to achieve improvement of the torque at the starting time and improvement of the accelerating property from the extremely low speed.

As the engine revolutions Ne becomes large, the intake switch valve 17 is controlled according to the supercharging switch map M4 on the basis of the engine revolutions Ne and the instructed injection amount Qf. In the case that the engine revolutions Ne and the instructed injection amount Qf become high, and the exhaust gas energy comes to a high state therewith, the ECU 12 further opens the intake switch valve 17 and disconnects the S/C clutch 16a after the intake switch valve 17 is fully opened.

As a result, the supercharging only by the T/C 14 is performed. Further, in the case where the flow rate of the exhaust gas becomes much, the ECU 12 closes the LP-EGR valve 44 and opens the HP-EGR valve 46 according to an EGR switch map M5, thereby recirculating the EGR gas by the HP-EGR system 42.

Further, in the range in which the flow rate of the exhaust gas is large, it is possible to use the T/C 14 which is driven by the exhaust gas energy in place of the S/C 15, and it is possible to suppress deterioration of the fuel consumption which is generated by continuously driving the S/C 15. In addition, in a state in which the exhaust gas energy is high, it is possible to use the HP-EGR 42 which can supply the EGR gas more stably than the LP-EGR 41.

Since the HP-EGR 42 is disposed in the exhaust gas upstream side and has the shorter supply route of the EGR gas in comparison with the LP-EGR 41 which is provided in the exhaust gas downstream side of the T/C 14, it is possible to prevent an internal corrosion of the compressor and the exhaust pipe of the T/C 14, and it is further possible to prevent deterioration of the fuel consumption.

In the case of transiting from the normal running state to the accelerating running by operating the accelerator pedal P1, the S/C clutch 16a is connected in this state to perform the supercharging by the S/C 15, or to perform the combined supercharging of two stages of the S/C 15 and the T/C 14 on the basis of the control of the intake switch valve 17.

According to the motion mentioned above, it is possible to achieve downsizing of the engine 10 by determining whether the heavy load time or the light load time according to the traction load W1 of the semi-trailer 1, performing the supercharging by the S/C 15 at the starting time and the transient time under the heavy load condition, and performing the supercharging by the T/C 14 at the normal running time under the heavy load condition and the running time under the light load condition. Further, it is also possible to optimize the transmission 21.

In more detail, it is possible to increase the starting torque and the torque in the low speed side by performing the combined supercharging of two stages of the S/C 15 and the T/C 14 at the heavy load time, so as to reduce the exhaust gas. Further, since the driving force which is necessary for driving the S/C 15 is no longer effective after disconnecting the S/C clutch 16a for driving the S/C 15 at the light load time, it is possible to achieve improvement in the fuel consumption.

Meanwhile, in the embodiment, the intake switch valve 17 is controlled on the basis of the supercharging switch map M4 which is based on the engine revolutions Ne calculated from the signal detected by the crank angle sensor S2, and the instructed injection amount Qf injected from the injector, but the method of switching the operation of the supercharger is not limited to the method mentioned above. For example, it is possible to use a method of calculating the instructed injection amount Qf on the basis of an opening degree of the intake throttle 35, the air-fuel ratio, etc.

Further, the intake switch valve 17 is controlled so as to be fully closed in the case where the brake ON is detected by the brake sensor S8 which is provided in the brake pedal P2, or in the case where the vehicle speed zero is detected by the vehicle sensor S6. As a result, it is possible to smoothly perform the motion mentioned above at the restarting from the idle state.

In addition, it is preferable to perform the supercharging according to the operating state of the semi-trailer 1 by the VGS mechanism which is provided in the T/C 14, in the case of performing the single supercharging only by the T/C 14.

Further, as the load determining unit configured to determine the traction load W1 which the semi-trailer 1 tows, the embodiment determines by comparing the traction load W1 with the previously defined traction determination value Wn, but it is possible to use a plurality of determining methods, for example, having a step of determining whether or not the tractor head 2 tows the trailer 3, and a step of determining whether or not the trailer 3 has the container 4 on board. Further, in the case of the cargo vehicle such as the truck, the method determines by using a previously defined load determination value, but it is sufficient to determine whether or not the trailer has the cargo on board in this case.

The semi-trailer 1 mounting the engine 10 thereon can obtain the operations and effects mentioned above by switching the supercharging modes according to the traction load W1 applied to the semi-trailer 1. Further, it is possible to mount the engine 10 in which the downsizing and the speeding down are performed and the downsized transmission 21, thus enabling to further improve the fuel consumption and to reduce the manufacturing cost.

The present invention can be also applied to a flat body type truck which has the cargo on board with its loading condition significantly varies.

Since the internal combustion engine according to the present invention can achieve the downsizing of the internal combustion engine by switching between the combined supercharging by the supercharger and the turbocharger and the single supercharging only by the turbocharger, according to the traction load which the vehicle tows, or the loading load loaded on the vehicle, the internal combustion engine according to the present invention can be utilized particularly in the vehicle such as the semi-trailer and the flat body type truck in which the load condition significantly varies.

The invention claimed is:

1. A traction vehicle having an internal combustion engine including a supercharger and a turbocharger, and comprising:
   a load sensor positioned at a connection portion between the traction vehicle and a towed vehicle which senses a traction load which a vehicle tows or a load loaded on the vehicle;
   an operating state acquiring sensor which acquires an operating state of the engine; and
   a control device which controls the engine and supercharging of the engine and is configured to:
   stop the supercharger and perform the supercharging only by the turbocharger a whole range of a first operating range of the internal combustion engine by the control device, when the sensed traction load or the load loaded on the vehicle is not more than a predetermined determination value,
   drive the supercharger and perform the supercharging by both the supercharger and the turbocharger, when the acquired operating state of the internal combustion engine is in a second operating range set on a low rotational speed range and when the sensed traction load or the load loaded on the vehicle is larger than the predetermined determination value, and
   stop the supercharger and perform the supercharging only by the turbocharger, when the acquired operating state of the internal combustion engine is in third operating range set on a high rotational speed range and when the sensed traction load or the load loaded on the vehicle is larger than the predetermined determination value.

2. The traction vehicle having an internal combustion engine according to claim 1, further comprising:
   a low pressure exhaust gas recirculation system which recirculates an exhaust gas in a downstream side of exhaust gas in the turbocharger;
   a high pressure exhaust gas recirculation system which recirculates an exhaust gas in an upstream side of the exhaust gas in the turbocharger; and
   the control device is further configured to,
   recirculate the exhaust gas by the low pressure exhaust gas recirculation system in the whole range of the first operating range of the engine, when the sensed traction load or the load loaded on the vehicle is not more than the predetermined determination value,
   recirculate the exhaust gas by the low pressure exhaust recirculation system when the acquired operating state of the engine is in the second operating range set on the low rotational speed range, and
   recirculate the exhaust gas by the high pressure exhaust gas recirculation system when the acquired operating state of the engine is in the third operating range set on the high rotational speed range, and when the sensed traction load or the load loaded on the vehicle is greater than the predetermined determination value.

3. A control method for an internal combustion engine including a supercharger and a turbocharger, the method comprising:
   sensing a traction load which a vehicle tows or a load loaded on the vehicle by a load sensor positioned at a connection portion between the traction vehicle and a towed vehicle; and
   comparing the sensed traction load or the load loaded to a predetermined determination value;
   stopping the supercharger and performing supercharging only by the turbocharger in a whole range of a first operating range of the engine, when the sensed traction load or the load loaded is not more than the predetermined determination value;
   acquiring an operating state of the engine,
   driving the supercharger and performing the supercharging by both the supercharger and the turbocharger when the acquired operating state of the internal combustion engine is in a second operating range set on a low rotational speed range and when the sensed traction load or the load loaded on the vehicle is larger than the predetermined determination value; and
   stopping the supercharger and performing the supercharging only by the turbocharger, when the acquired operating state of the engine is in a third operating range set on a high rotational speed range and when the sensed traction load or the load loaded on the vehicle is larger than the predetermined determination value.

4. The control method for the internal combustion engine according to claim 3, further comprising:
   recirculating exhaust gas by a low pressure exhaust gas recirculation system in the whole range of the first operating range of the engine, when the sensed traction load or the load loaded is not more than the predetermined determination value;
   recirculating the exhaust gas by the low pressure exhaust recirculation system when the acquired operating state of the engine is in the second operating range set on the low rotational speed range; and
   recirculating the exhaust gas by a high pressure exhaust gas recirculation system, when the acquired operating state of the engine is in the third operating range set on the high rotational speed range, and when the sensed traction load or the load loaded on the vehicle is greater than the predetermined determination value.

5. The traction vehicle having an internal combustion engine according to claim 1, wherein the second operating range is set at a starting time and a transient time of the vehicle, and the third operating range is set at a normal running time of the vehicle.

6. The traction vehicle having an internal combustion engine according to claim 2, wherein at an operating state of the engine at a boundary between the second operating range and the third operating range, an exhaust manifold internal pressure and an intake manifold internal pressure become the same.

* * * * *